United States Patent
Lee et al.

(10) Patent No.: US 8,102,862 B2
(45) Date of Patent: *Jan. 24, 2012

(54) RADIO LINK PARAMETER UPDATING METHOD IN MOBILE COMMUNICATION SYSTEM

(75) Inventors: Young-Dae Lee, Guynggi-Do (KR); Jin-Young Park, Gyunggi-Do (KR); Eun-Jung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 716 days.

This patent is subject to a terminal disclaimer.

(21) Appl. No.: 12/269,224

(22) Filed: Nov. 12, 2008

(65) Prior Publication Data

US 2009/0093243 A1  Apr. 9, 2009

Related U.S. Application Data

(63) Continuation of application No. 10/406,581, filed on Apr. 4, 2003, now Pat. No. 7,822,044.

(30) Foreign Application Priority Data

Apr. 6, 2002  (KR) .................... 2002-18819

(51) Int. Cl.
*H04L 12/28* (2006.01)
*H04L 12/56* (2006.01)

(52) U.S. Cl. ....................................... 370/400

(58) Field of Classification Search .......... 370/468, 370/477, 331, 310, 310.2, 311, 328, 332, 370/333, 352, 353, 354, 355, 356, 329, 347, 370/349, 335, 400, 474, 392, 522, 208, 209, 370/312, 342, 465; 455/67.13, 436, 437, 455/69, 434, 438, 439, 522, 466

See application file for complete search history.

(56) References Cited

U.S. PATENT DOCUMENTS

| 5,475,862 A | 12/1995 | Sawyer | 455/33.1 |
| 5,594,949 A | 1/1997 | Andersson et al. | 455/437 |
| 6,347,091 B1 | 2/2002 | Wallentin et al. | 370/437 |

(Continued)

FOREIGN PATENT DOCUMENTS

CN  1277764 A  12/2000

(Continued)

OTHER PUBLICATIONS

Final Office Action dated Nov. 20, 2009 for U.S. Appl. No. 10/406,581.

(Continued)

*Primary Examiner* — Raj Jain
(74) *Attorney, Agent, or Firm* — KED & Associates LLP

(57) ABSTRACT

A radio link (RL) parameter updating method of a high speed downlink packet access (HSDPA) system in a mobile communication system is disclosed. According to a radio channel situation of a terminal, an RL parameter applied to transmission and reception of control information between the terminal and a base station is dynamically controlled. For this purpose, the RL parameter updating method includes: a step in which the base station determines whether to update an HSDPA related parameter and transmits the parameter update information to the RNC to trigger updating of the RL parameter; and a step in which the RNC updates the HSDPA related parameter and transmits it to the terminal. The parameter update information is delivered through an RL parameter update response message, and the RNC is a serving RNC.

40 Claims, 12 Drawing Sheets

U.S. PATENT DOCUMENTS

| | | | |
|---|---|---|---|
| 6,442,150 B1 | 8/2002 | Kondo et al. | 370/331 |
| 6,505,058 B1 | 1/2003 | Willey | 455/574 |
| 6,574,473 B2 | 6/2003 | Rinne et al. | 455/436 |
| 6,823,193 B1 | 11/2004 | Persson et al. | 455/522 |
| 6,977,888 B1 | 12/2005 | Frenger et al. | 370/218 |
| 7,006,464 B1 | 2/2006 | Gopalakrishnan et al. | 370/328 |
| 7,245,598 B2 * | 7/2007 | Puig-Oses et al. | 370/334 |
| 7,283,502 B1 | 10/2007 | Abraham et al. | 370/337 |
| 7,295,536 B2 | 11/2007 | Refai et al. | 370/331 |
| 2001/0003638 A1 | 6/2001 | Warner et al. | 430/253 |
| 2001/0036238 A1 | 11/2001 | Baker et al. | 375/358 |
| 2003/0109274 A1 | 6/2003 | Budka et al. | 455/522 |
| 2003/0189918 A1 | 10/2003 | Das et al. | |

FOREIGN PATENT DOCUMENTS

| | | |
|---|---|---|
| CN | 1291413 A | 4/2001 |
| EP | 0 877 513 | 11/1998 |
| EP | 1 041 850 | 10/2000 |
| JP | 2003-530041 A | 10/2003 |
| JP | 2003-536349 A | 12/2003 |
| KR | 10-2000-0020622 A | 4/2000 |
| KR | 10-2001-0028530 A | 6/2001 |
| RU | 2 139 631 C1 | 10/1999 |
| WO | WO 97/12490 | 4/1997 |
| WO | WO 98/03030 | 1/1998 |
| WO | WO 99/12304 | 3/1999 |
| WO | WO 99/43178 | 8/1999 |
| WO | WO 00/47006 A1 | 8/2000 |
| WO | WO 00/78081 A1 | 12/2000 |
| WO | WO 01/31832 A1 | 5/2001 |
| WO | WO 01/47144 A1 | 6/2001 |
| WO | WO 01/76277 A2 | 10/2001 |
| WO | WO 01/99313 A1 | 12/2001 |

OTHER PUBLICATIONS

Chinese Office Action dated Mar. 10, 2006.
Japanese Notice of Allowance dated May 15, 2009.
European Search Report dated Feb. 10, 2006.
European Search Report dated Nov. 25, 2005.
Japanese Office Action dated Sep. 4, 2007.
Japanese Office Action dated Jan. 16, 2007.
Japanese Office Action dated Apr. 8, 2008.
3GPP TS 25.331 V3.5.0; $3^{rd}$ Generational Partnership Project; Technical Specification Group Radio Access Network; RRC Protocol Specification (Release 1999).
3GPP TR 25.858 V5.0.0 (Mar. 2002); $3^{rd}$ Generation Partnership Project; TechnicalSpecification Group Radio Access Network; High Speed Downlink Packet Access: Physical Layer Aspects (Release 5).
3GPP TS 25.214 V5.0.0 (Mar. 2002); $3^{rd}$ Generation Partnership Project; Technical Specification Group Radio Access Network; Physical Layer Procedures (FDD)); (Release 5); Mobile Competence Centre; 650, Route Des Lucioles; F-06921 Sophia-Antipolis Cedex; France; Mar. 1, 2002; pp. 1-56.
European Search Report dated Aug. 10, 2011 issued in Application No. 03 007 776.2.
Korean Office Action dated May 27, 2008.
Chinese Decision to Grant dated Feb. 7, 2007.
Russian Decision to Grant dated Jul. 10, 2006.

* cited by examiner

US 8,102,862 B2

RADIO LINK PARAMETER UPDATING METHOD IN MOBILE COMMUNICATION SYSTEM

CROSS-REFERENCE TO RELATED APPLICATIONS

This application is a Continuation Application of prior U.S. patent application Ser. No. 10/406,581 filed Apr. 4, 2003 now U.S. Pat. No. 7,822,044, which claims priority under 35 U.S.C. §119 to Korean Application No. 18819/2002 filed on Apr. 6, 2002, whose entire disclosures are hereby incorporated by reference.

BACKGROUND

1. Field

The present invention relates to a 3GPP universal mobile telecommunications system (UMTS) and, more particularly, to a method for updating a radio link parameter in a system providing a high speed downlink packet access (HSDPA) service.

2. Background

In order to support a high speed packet data service in downlink, in third generation partnership project (3GPP) UMTS system, there is a transport channel called a high speed downlink shared channel (HS-DSCH). The HS-DSCH is used in a system supporting a high speed downlink packet access (HSDPA). The HS-DSCH uses a short transmission time interval (TTI) (3 slot, 2 ms) and supports various modulation code sets (MCS) to support a high data rate. That is, the UMTS system can attain optimum data transmission performance by selecting MCS based on channel condition and using Hybrid ARQ that combines automatic repeat request (ARQ) and coding techniques.

The HS-DSCH transmits a high speed user data at every sub-frame of 2 ms. The transport channel, HS-DSCH, is mapped onto a physical channel called a high speed physical downlink shared channel (HS-PDSCH).

For transmission of user data through the HS-DSCH, control information should be transmitted. The control information is transmitted through the downlink (DL) shared control channel (HS-SCCH) and the uplink (UL) dedicated physical control channel (HS-DPCCH).

The downlink shared control channel (HS-SCCH) is a type of a downlink (DL) common control channel to support the HSDPA technique. The DL HS-SCCH is a downlink physical channel with spreading factor of 128 and data rate of 60 kbps. The HS-SCCH is used to transmit a UE ID (identification) and control information so that the UE can receive HS-DSCH transmitting a high speed user data after receiving HS-SCCH.

FIG. 1 illustrates a frame structure of the uplink HS-DPCCH.

With reference to FIG. 1, the uplink HS-DPCCH is constructed with a radio frame with a period (Tf) of 10 ms and each radio frame consists of five sub-frames of 2 ms. One sub-frame consists of three slots.

The uplink HS-DPCCH transmits an uplink feedback signaling related to transmission of a downlink HS-DSCH data. The uplink feedback signaling generally includes ACK (acknowledgement)/NACK (negative acknowledgement) information for the HARQ and a channel quality indicator (CQI). The ACK/NACK information is transmitted at the first slot of the HS-DPCCH sub-frame and the CQI is transmitted at the second and third slots of the HS-DPCCH sub-frame. The HS-DPCCH is always configured with the UL DPCCH. The ACK/NACK informs ACK or NACK information for a user data packet transmitted through the DL HS-DSCH according to the HARQ mechanism, and the CQI transmits status information of the downlink radio channel obtained from the measurement of the DL CPICH (Common Pilot Channel) in the UE, to a base station.

FIG. 2 illustrates a structure of a UMTS radio access network (UTRAN).

With reference to FIG. 1, the UTRAN includes a serving RNC (SRNC) and a drift RNC (DRNC) that control a base station (a node B). In a soft handover, the terminal (UE) maintains radio links with base stations connected to the SRNC and the DRNC. In this case, the base station (node B) and RNC (the SRNC and the DRNC) are connected over the Iub interface, and the SRNC and the DRNC are connected over the Iur interface. An interface between the SRNC and a core network (CN) is referred to the Iu interface.

In general, the radio network controller (RNC) directly manages the node B and is classified into a controlling RNC (CRNC) (not shown) managing a common radio resource and a serving RNC (SRNC) managing a dedicated radio resource assigned to respective UEs 122.

The DRNC exists in a drift radio network subsystem (DRNS) and, if the UE moves from a region covered by the SRNC to a region covered by the DRNC, the DRNC provides its own radio resource to the UE.

In the UTRAN, a radio access interface protocol is divided into a control plane and a user plane. The user plane is a domain where user traffic such as voice or an IP packet is transmitted. The control plane is a domain where control information is transmitted.

FIG. 3 illustrates a control plane protocol in the UTRAN.

With reference to FIG. 2, the control plane protocol includes a radio resource control (RRC) protocol used between the UE and the RNC, a node B application part (NBAP) protocol used between the base station (node B) and the RNC, and a radio network subsystem application part (RNSAP) protocol used between the RNC and the core network (CN). The NBAP, RNSAP and RANAP protocols can contain various control messages between the base station and RAN, between the RNCs and between the core network and the RNC. In case that the control message is transmitted in the user plane, it is transmitted as a type of control frame of frame protocol, while in case that the control message is transmitted in the control plane, it is transmitted as a type of NBAP or RNSAP message.

FIG. 4 shows an example procedure for configuration of the HS-DSCH channel when the dedicated channel (DCH) is configured in the UE.

First of all, a radio link (RL) for the HS-DSCH is reconfigured. For this purpose, the SRNC sends an RL reconfiguration prepare message to the DRNC to initiate the RL reconfiguration procedure (step S102).

The DRNC sends the RL reconfiguration prepare message to each node B to request each node B to prepare a synchronized RL reconfiguration procedure (step S104). Then, the corresponding node B configures a radio resource for the HS-DSCH and sends an RL reconfiguration ready message as a response to the RL reconfiguration prepare message (step S106).

After the DRNC completes the preparation of RL reconfiguration, it sends an RL reconfiguration ready message to the SRNC (step S108). The SRNC sends an RL reconfiguration commit message to the DRNC (step S110), and the DRNC sends the RL reconfiguration commit message to the node B (step S112).

Through these steps, a radio link and a transport bearer for HS-DSCH are configured. That is, an ALCAP Iub transport bearer is set between the node B and the DRNC, and an ALCAP Iur transport bearer is set between the DRNC and the SRNC.

After the setup of the radio link is completed, the SRNC sends a radio bearer reconfiguration message to the UE to set up an HS-DSCH (step S114), and the UE responds thereto with a radio bearer reconfiguration complete message (step S116). Such messages are sent as an RRC (radio resource control) message.

With those steps completed, an HS-DSCH transport channel is set up and an MAC-hs sub-layer is constructed in the node B to manage HS-DSCH transmission.

Thereafter, when there is a downlink data to be transmitted, the SRNC sends an HS-DSCH capacity request control frame to the DRNC (step S118) and the DRNC forwards the corresponding message to the node B (step S120). Then, the node B determines the amount of data that can be sent for the HS-DSCH and reports the determined information to the DRNC through a HS-DSCH capacity allocation control frame of a frame protocol (step S122), and the DRNC sends the HS-DSCH capacity allocation control frame to the SRNC (step S124).

Afterwards, the SRNC starts to send downlink data to the node B (step S126) and the node B initiates transmission of the downlink data through the HS-DSCH. That is, the node B transmits signaling information related to the HS-PDSCH to the UE through the shared control channel (HS-SCCH) (step S128) and transmits the HS-DSCH data to the UE through the HS-PDSCH (step S130).

With reference to FIG. 6, if the DCH is not configured, the radio link setup procedure is used in place of the radio link (RL) reconfiguration procedure.

A detailed physical layer procedure that the UE transmits a feedback signal (ACK or NACK) through the HS-DPCCH after receiving the HS-DSCH data is as follows:

The UE monitors a UE ID transmitted through HS-SCCH to recognize whether there is data it is to receive. Then, if there is data it is to receive, the UE receives the control information transmitted through the HS-SCCH and the HS-DSCH data transmitted through the HS-PDSCH using the received control information. The UE decodes the received HS-PDSCH data, checks a CRC, and transmits ACK or NACK to a base station according to the CRC check result.

At this time, the UE can repeatedly transmits ACK/NACK during multiple consecutive HS-DPCCH sub-frames. The number of the consecutive HS-DPCCH sub-frames for ACK/NACK repetition is equal to a repetition factor of ACK/NACK, N_acknack_transmit. If, however, the UE fails to acquire control information corresponding to itself from the monitored HS-SCCH, it does not transmit ACK/NACK to the base station.

In addition, the UE measures a common pilot channel (CPICH) and transmits a channel quality indicator (CQI) value. the UE repeatedly transmits CQI during multiple consecutive HS-DPCCH sub-frames. The number of the consecutive HS-DPCCH sub-frames for CQI repetition is equal to a repetition factor of CQI, N_cqi_transmit.

As afore-mentioned, in the conventional HSDPA system, the radio link parameter updating process is initiated only by the RNC. That is, the RNC detects/determines whether update of a parameter for a radio link is necessary, and if the parameter needs to be updated, the RNC sends an updated radio parameter value to the node B. In other words, the node B can not update the HS-DPCCH parameters by its own decision but can merely update the HS-DPCCH parameters only through the radio bearer reconfiguration procedure the RNC triggers.

However, in the HSDPA system, a HSDPA scheduler exists in the node B, so that it should be possible that a HSDPA scheduler updates the HS-DPCCH parameters by its own decision even without an initiation of the RNC if the update is necessary.

In the case that the RNC starts updating the HS-DPCCH related parameter (i.e., ACK/NACK, and the period and repetition information of CQI, etc.), the HSDPA scheduler of the node B can not control on its own the ACK/NACK transmission and the CQI reporting according to channel condition for the UE (terminal). Thus, the conventional parameter updating method is disadvantageous in that the HSDPA scheduling is limited and the radio resource is inefficiently used.

The above references are incorporated by reference herein where appropriate for appropriate teachings of additional or alternative details, features and/or technical background.

SUMMARY OF THE INVENTION

Therefore, an object of the present invention is to provide a radio link parameter updating method that is capable of effectively operating HSDPA scheduling function and radio resource management.

Another object of the present invention is to provide a parameter updating method in which a radio link parameter can be updated in a base station.

Still another object of the present invention is to provide a parameter updating method in which a base station can initiate updating a radio link parameter without RNC's initiation.

Yet another object of the present invention is to provide a signaling for sending a to-be-updated parameter value from a base station to an RNC.

Another object or the present invention is to provide a radio link parameter updating method initiated by a base station reflecting a radio link situation.

Another object of the present invention is to provide a basic procedure for supporting a method of signaling parameter updated in a base station to an RNC.

Another object of the present invention is to provide a basic procedure by which an RNC provides information used for updating a parameter to a base station.

Another object of the present invention is to provide a basic procedure by which a radio network controller informs a base station of a radio link situation of a terminal.

To achieve at least the above objects in whole or in parts, there is provided a radio link parameter updating method for a high speed downlink packet access (HSDPA) system in a mobile communication system, in which a base station triggers updating of a radio link parameter to an RNC to dynamically change a parameter of a radio link depending on a radio channel situation.

Preferably, the parameter is an uplink parameter between a terminal and a base station which is a HSDPA related parameter. In this case, the HSDPA related parameter can be a high speed dedicated physical control channel (HS-DPCCH) related parameter, a high speed downlink shared channel (HS-DSCH) related parameter and a downlink shared control channel (HS-SCCH) related parameter. The base station triggers updating the parameter by sending parameter update information to the RNC.

Preferably, the parameter update information is a radio link (RL) parameter update request message. The RL parameter update request message includes at least one of a channel quality indicator (CQI) feedback cycle value, an ACK/NACK repetition factor value, a CQI repetition factor value, a CQI power offset, ACK power offset and/or NACK power offset value, and an HS-SCCH code change indicator value.

If a radio channel state (situation) of the terminal is changed, the base station can determine whether to update a RL parameter. The parameter updating is performed at every reporting period or whenever a parameter indicating a state of the radio link situation exceeds a certain threshold value. The period and the threshold value are internally set or are sent from the RNC through the RL parameter update initiation message.

Preferably, the base station can control the parameter update information according to an RL configuration information of the terminal.

Preferably, the RL configuration information is sent from the RNC to the base station through an RL configuration information message. In this case, the base station analyzes the RL configuration information of the current terminal, and triggers the parameter updating when the terminal enters or leaves a handover situation. In addition, the base station analyzes the RL configuration information of the current terminal and triggers the parameter updating when there is a change in the number of radio links of the terminal.

Preferably, the RNC sends time information indicating when the updated parameter is to be applied, to the base station. The RNC sends the updated parameter and the time information to the terminal through the radio resource control (RRC) signaling. In this case, the time information is an activation time or a connection frame number (CFN) parameter, and the time information is the same as time information sent to the base station.

In the above method, the RNC is a serving RNC (SRNC).

To achieve at least these advantages in whole or in parts, there is further provided a radio link parameter updating method for a high speed downlink packet access (HSDPA) system in a mobile communication system, in which, if there is a function difference between a scheduler of the base station and a scheduler of an RNC, the RNC finally performs updating of a parameter of a radio link as the base station triggers the parameter updating.

Preferably, the RNC is a serving RNC (SRNC).

Preferably, the radio link parameter is a high speed dedicated physical control channel (HS-DPCCH) related parameter.

Preferably, the base station sends to-be-updated parameter information to the RNC to trigger the parameter updating in the RNC, and the parameter information is a radio link (RL) parameter update request message. The RL parameter update request message includes at least one of a channel quality indicator (CQI) feedback cycle value, an ACK/NACK repetition factor value, a CQI repetition factor value, a CQI power offset, an ACK power offset and/or NACK power offset value, and an HS-SCCH code change indicator value.

Preferably, the parameter update information is controlled according to radio link configuration information of the current terminal, and the radio link configuration information is sent from the RNC to the base station.

Preferably, the parameter updating is performed at every reporting period or whenever a parameter indicating the state of a radio link situation exceeds a certain threshold value. The period and the threshold value are internally set or are sent from the RNC.

To achieve at least these advantages in whole or in parts, there is further provided a radio link parameter updating method for a high speed downlink packet access (HSDPA) system in a mobile communication system, including: a step in which a base station monitors a radio channel situation of a terminal; a step in which if a radio channel situation of the terminal changes, the base station initiates parameter updating; and a step in which the base station sends radio link parameter update information to the RNC.

Preferably, the RNC is a serving RNC (SRNC).

Preferably, the radio link parameter is a high speed dedicated physical control channel (HS-DPCCH) related parameter. And the radio link parameter is a high speed downlink shared channel (HS-DSCH) related parameter and a downlink shared control channel (HS-SCCH) related parameter.

Preferably, the parameter update information is a radio link (RL) parameter update request message. The RL parameter update request message includes at least one of a channel quality indicator (CQI) feedback cycle value, an ACK/NACK repetition factor value, a CQI repetition factor value, a CQI power offset, an ACK power offset and/or NACK power offset value, and an HS-SCCH code change indicator value, and the parameter update information is sent through an RL parameter update request message.

In the method, the parameter updating is performed at every reporting period or whenever a parameter indicating the state of a radio link situation exceeds a certain threshold value. The period and the threshold value are internally set or are sent from the RNC.

The radio link parameter updating method further includes a step in which criteria for decision of the parameter updating is sent from the RNC to the base station through the RL parameter update initiation message.

In the method, the decision criteria may include a parameter indicating which parameter the base station should measure to detect change of a radio link; an event type parameter indicating whether to perform parameter updating periodically or on the basis of an event; and a parameter indicating an actual period for the event type parameter or a threshold value.

The radio link parameter updating method further includes a step in which when the radio link connected to the terminal changes, the RNC sends new radio link configuration information to the base station.

Preferably, the base station constructs the parameter update information to be sent to the RNC according to the new radio link configuration information, and the new RL configuration information is sent through an RL configuration information message. In this case, the base station analyzes the RL configuration information of the current terminal, and triggers the parameter updating when the terminal enters or leaves a handover situation. In addition, the base station analyzes the RL configuration information of the current terminal and triggers the parameter updating when there is a change in the number of radio links of the terminal.

The radio link parameter updating method further includes a step in which the updated RL parameter and the time information indicating when to apply the parameter are sent from the RNC to the base station.

Preferably, the time information is activation time or a connection frame number (CFN) parameter.

The radio link parameter updating method further includes a step in which the updated RL parameter and the time information indicating when to apply the parameter are sent from the RNC to the terminal.

To achieve at least these advantages in whole or in parts, there is further provided a radio link parameter updating method for a high speed downlink packet access (HSDPA) system in a mobile communication system, including: a radio link (RL) parameter update procedure in which if a radio channel of a terminal is changed, parameter update information is sent to a radio network controller (RNC) to trigger updating of an HSDPA related parameter; and a radio resource control (RRC) procedure in which the HSDPA related parameter is updated according to the received parameter update information and the updated parameter is signaled from the RNC to the terminal.

Preferably, the RNC is a serving RNC (SRNC).

Preferably, the parameter update information is sent through an RL parameter update request message.

Preferably, the RL parameter update request message includes at least one of a channel quality indicator (CQI) feedback cycle value, an ACK/NACK repetition factor value, a CQI repetition factor value, a CQI power offset, ACK power offset and/or NACK power offset value, and an HS-SCCH code change indicator value.

Preferably, the RNC sends the HSDPA related parameter which has been updated through the RL parameter update response message and time information indicating a time point when the parameter is to be actually applied, to the base station. In this case, the time information can be activation time or a connection frame number (CFN) parameter. In addition, the RNC sends the updated HSDPA related parameter and the time information indicating a time point when the parameter is actually applied, to the terminal by using radio bearer reconfiguration, transport channel reconfiguration, or physical channel reconfiguration message.

Preferably, the RL parameter update procedure is performed at every reporting period or whenever a parameter indicating the state of a radio link situation exceeds a certain threshold value. The period and the threshold value are internally set or are sent from the RNC.

The radio link parameter updating method further includes: an RL parameter update initiation procedure in which the RNC sends information used for update of a HSDPA related parameter to Node B through an RL parameter update initiation request message.

Preferably, the RL parameter update initiation request message includes: a parameter indicating which parameter the base station should measure to detect change of a radio link; an event type parameter indicating whether to perform parameter updating periodically or on the basis of an event; and a parameter indicating an actual period for the event type parameter or a threshold value.

The radio link parameter updating method further includes: an RL configuration information procedure used to signal an RL configuration information of the terminal from the RNC to the base station by using the RL configuration information message.

Preferably, the base station performs an RL parameter update procedure by acquiring information on whether the terminal is in a soft handover and a change in the number of radio links on the basis of the RL configuration information message.

Preferably, the base station performs the RL parameter update procedure when the terminal enters or leaves a soft handover situation. In addition, the base station performs the RL parameter update procedure when the number of radio links for the terminal changes.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is implemented in such a mobile communication system as the UMTS (universal mobile telecommunications system), which has been recently developed by 3GPP. However, without being limited thereto, the present invention can be also applied to a communication system operated with different standards. Preferred embodiments of the present invention will now be described.

Referring to the HSDPA system, an HSDPA scheduler exists in a node B. The HSDPA scheduler of the node B transmits control information related to an HS-PDSCH through a shared control channel (HS-SCCH) to a UE in downlink and a HS-DSCH data through a HS-PDSCH to the UE in downlink. In response, the UE transmits a HSDPA-related feedback information (ACK/NACK, and CQI) to the node B through an HS-DPCCH in uplink. The HSDAP scheduler of Node B can configure a HSDPA related parameter (HS-DPCCH related, HS-DSCH related, or HS-SCCH related parameter) to control the transmissions in downlink and uplink. For explanations' sake, in the present invention, the parameter is confined to the HS-DPCCH related parameter.

The node B (HSDPA scheduler) may detect a situation of the radio channel on the basis of the HS-DPCCH related parameter and request updating of the HS-DPCCH related parameter.

For example, if the radio channel is in good condition, the node B reduces the repetition of ACK/NACK and CQI, thereby preventing consumption of the radio resource. Meanwhile, if the radio channel is not in a good condition, the node B increases the repetition of ACK/NACK and CQI, thereby improving performance of ACK/NAKC and CQI transmission. The HSDPA scheduler of the node B and the scheduler of the RNC will be referred to simply as a node B and the RNC hereinafter.

In order to improve a performance of an HSDPA system, the present invention proposes a radio link parameter update procedure initiated by the node B. The present invention also proposes a signaling for sending a to-be-updated parameter from the node B to the radio network controller (RNC), basic procedures to support the signaling, and an application example using the basic procedures.

Figure 1:
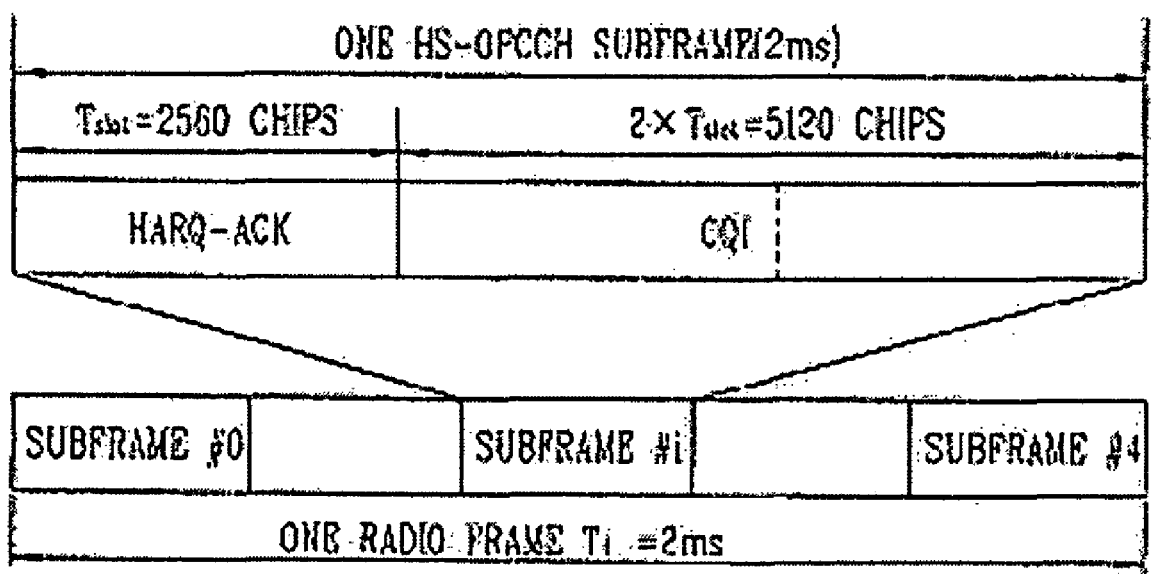
FIG. 1 illustrates a frame structure of an uplink HS-DPCCH in the HSDPA system.
Figure 2:
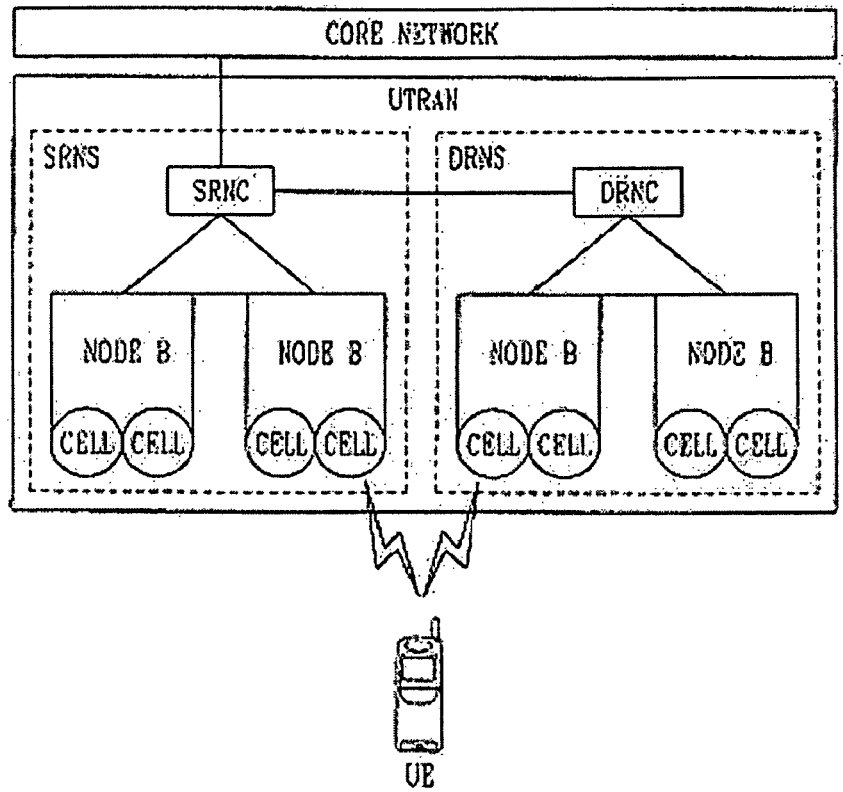
FIG. 2 illustrates a structure of a UMTS radio access network (UTRAN) in the HSDPA system.
Figure 3:
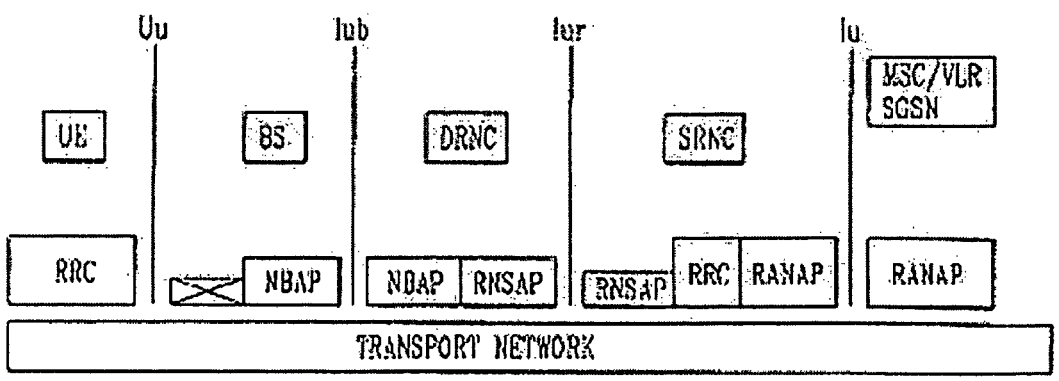
FIG. 3 illustrates a control plane protocol of the UTRAN.
Figure 4:
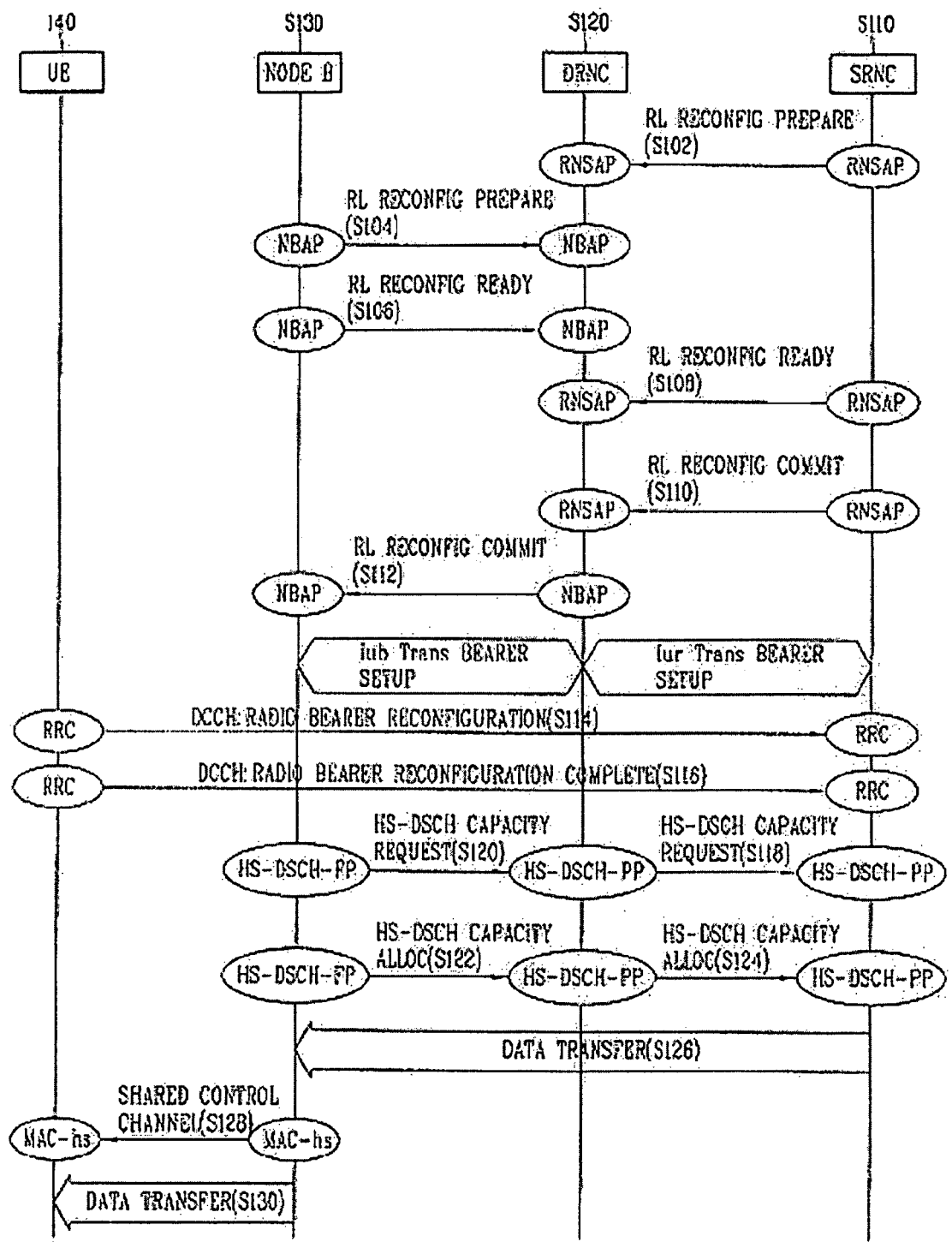
FIG. 4 illustrates a flow chart describing a procedure for setting up of a HS-DSCH channel in the HSDPA system.
Figure 5:
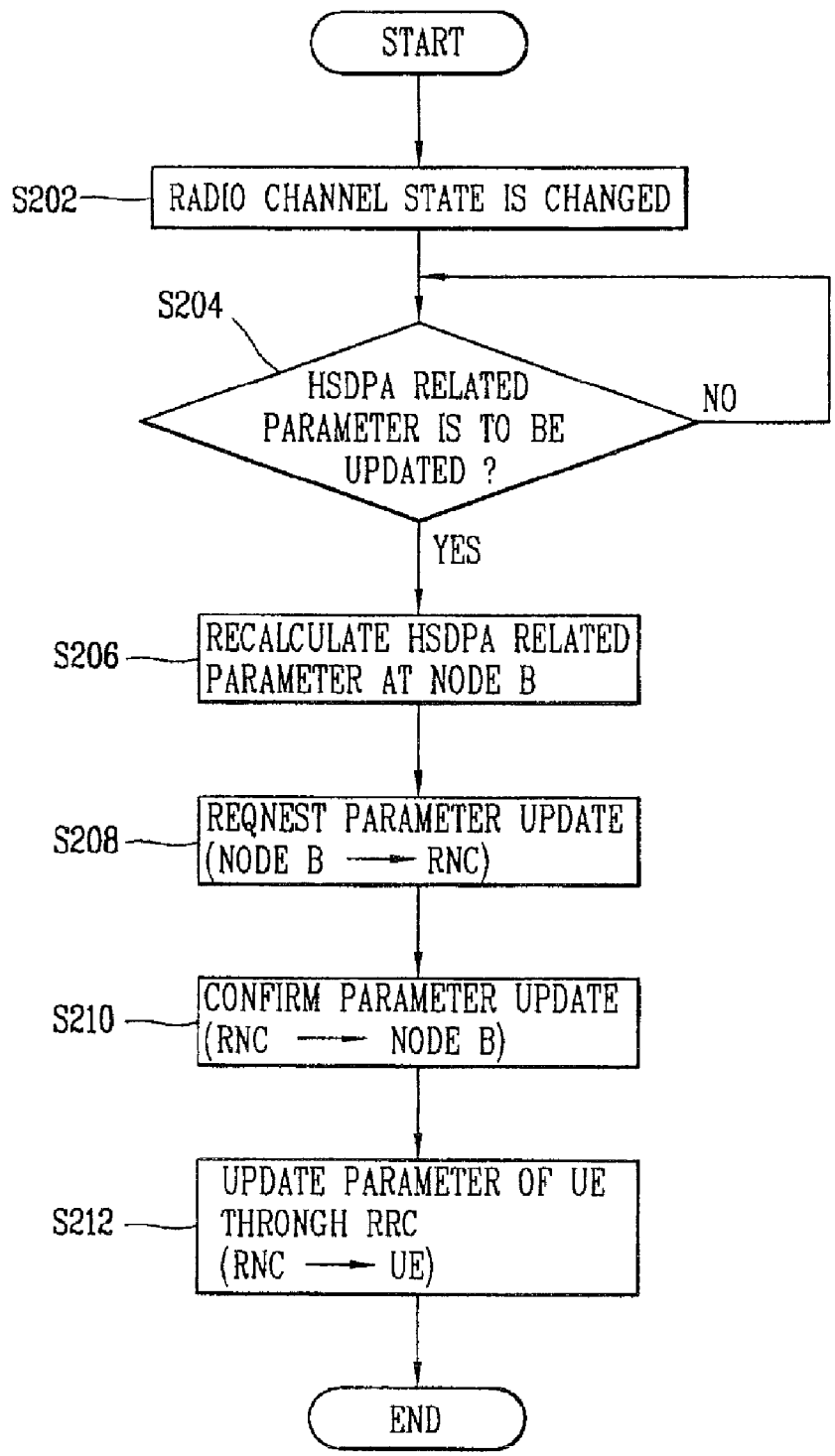
FIG. 5 is a flow chart of a HSDPA parameter updating method in accordance with the present invention.

FIG. 5 is a flow chart of an HSDPA parameter updating method in accordance with the present invention.

As shown in FIG. 5, when a state (situation) of the radio channel for the terminal (that is, the UE) which supports an HSDPA service (step S202) changes, the node B determines whether to update a HSDPA related parameter (step S204). If the node B determines updating the HSDPA related parameter, the node B calculates the corresponding parameter (step S206) and sends it to the RNC to request updating of the corresponding parameter (step S208).

Then, the RNC performs updating according to the parameter value received from the node B, informs the node B that updating has been completed (step S210), and sends the updated parameter to the UE through an RRC signaling to update the parameter of the UE (step S212). And then, the updated parameter can be sent to the node B together over the update response.

In the present invention, in order to trigger the updating of the HSDPA related parameter from the node B to the RNC according to the flow chart, the radio link (RL) parameter update procedure initiated by the base station is defined as follows.

1. RL Parameter Update Procedure

Figure 6A:
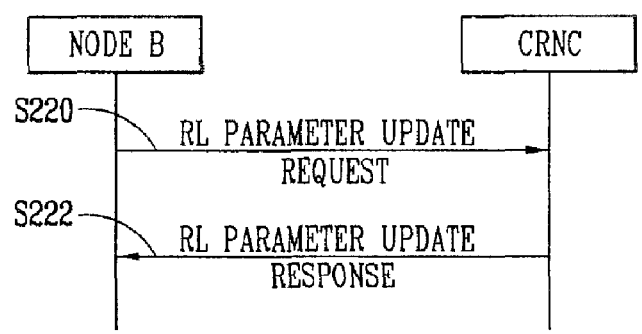
FIGS. 6A and 6B are flow charts of a radio link (RL) parameter update procedure, in case that the RL parameter update procedure is successful.
Figure 6B:
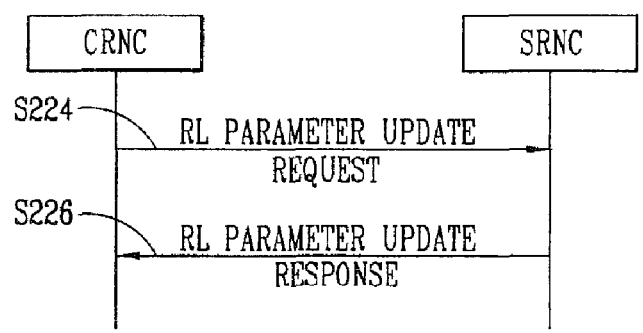
Figure 7A:
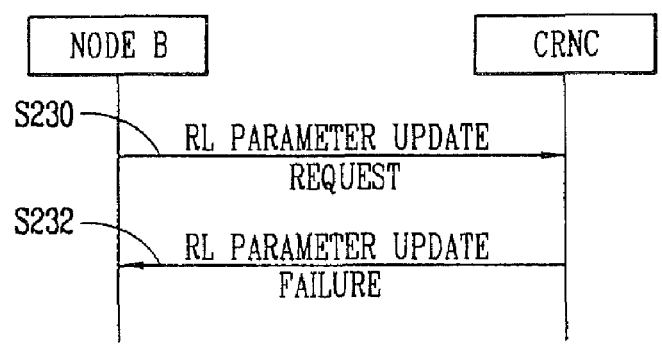
FIGS. 7A and 7B are flow charts of an RL parameter update procedure, in case that the RL parameter update procedure is failed.
Figure 7B:
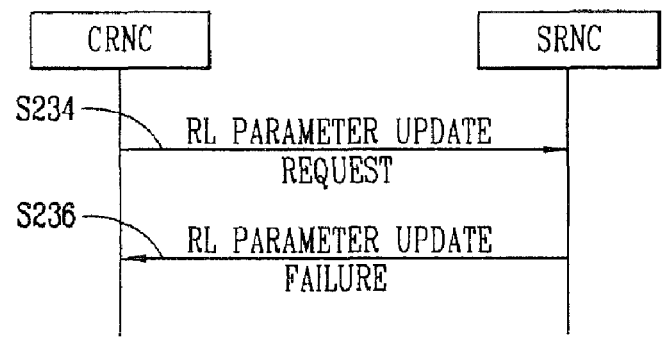

FIGS. 6A and 6B show the case that the RL parameter update procedure has been successfully performed, while FIGS. 7A and 7B show the case that the RL parameter update procedure has been failed.

If the situation of the radio channel for the UE changes, the node B determines whether to update the HSDPA related parameter and then performs the RL parameter update procedure, a basic procedure, to trigger the to-be-updated information to the node B.

That is, as shown in FIG. 6A, when the RL parameter update procedure is performed, the node B informs the CRNC of the to-be-updated information (step S220). In such a case, the to-be-updated information is a RL parameter update request message. The RL parameter update request message may contain a CQI feedback cycle parameter (k), an ACK/NACK repetition factor (N_acknack_transmit) and a CQI repetition factor (N_cqi_transmit), or may contain a CQI power offset, an ACK power offset and/or NACK power offset and HS-SCCH code change indicator.

After the CRNC updates the corresponding parameter by using the parameter value received from the node B, it responds thereto through an RL parameter update response message (step S222), which may contain the updated parameter and a parameter (that is, a connection frame number (CFN)) indicating a time point when the updated parameter is to be actually applied.

Accordingly, the HSDPA scheduler of the node B can control the ACK/NACK transmission and the CQI reporting which are performed by the UE, through the RL parameter update procedure, the basic procedure.

As mentioned above, in the RL parameter update procedure, the RNC finally performs the updating of parameter as requested by the node B. In this respect, however, if the node B and the RNC do not reach an agreement regarding update of a parameter, that is, if the node B needs updating of a parameter while the RNC does not need updating of the corresponding parameter, the RNC finally determines whether to update the parameter.

The CRNC and the SRNC may be collocated or may not be collocated. In case that the CRNC is not collocated with the SRNC owing to mobility of a UE, the CRNC can be connected with the SRNC on Iur interface.

If the CRNC is not collocated with the SRNC, as shown in FIG. 6B, the CRNC sends a parameter value which has been received by the node B to the SRNC (step S224), and the SRNC commands the node B to adopt the parameter updating through the RL parameter update response message (step S226).

In addition, the SRNC sends information on the HSDPA related parameter which has been received by the node B to the UE through the radio resource control (RRC) signaling. In this case, the RRC signaling may use a radio bearer reconfiguration, a transport channel reconfiguration, or a physical channel reconfiguration message.

FIGS. 7A and 7B show a signaling flow in case that the RL parameter update procedure is failed.

If the RL parameter update procedure is failed, the CRNC or the SRNC informs the node B of the failure of parameter updating through an RL parameter update failure message (steps S230, S232, S234 and S236).

In the present invention, the following four methods are used to determine whether or not the node B initiates updating the HSDPA related parameter.

1) The HSDPA related parameter is updated according to an internal implementation of the node B. In other words, an update period or a threshold value is internally set in the node B, so that when it's the update period or when the parameter indicating a state of the radio link exceeds a certain threshold value, parameter updating is performed. In this case, an additional signaling is not necessary on the interface between the node B and the RNC.

2) The HSDPA related parameter is updated by signaling between the node B and the RNC.

2-1) The HSDPA related parameter is periodically updated 2-2) If the parameter indicating the state of the radio link exceeds the threshold value, the HSDPA related parameter is updated 2-3) The HSDPA related parameter is updated according to whether the UE is in a soft handover The method 2) refers to a case that the RNC sets when the HSDPA related parameter value is to be received from the node B. The RNC sends a reporting condition of the HSDPA related parameter value to the node B through signaling. The method 2-1) refers to a periodical updating method while the method 2-2) refers to an event-based updating method.

Figure 8A:
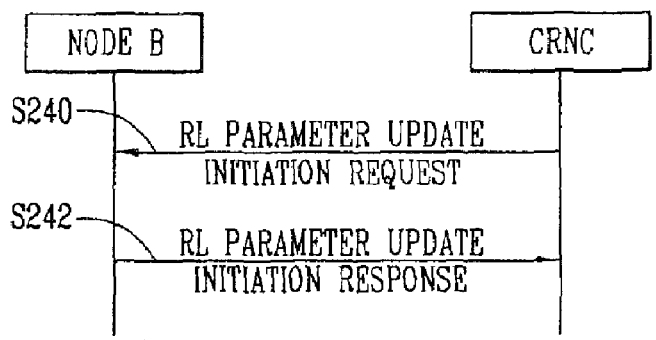
FIGS. 8A and 8B are flow charts of an RL parameter update initiation procedure, in case that the RL parameter update procedure is successful.
Figure 8B:
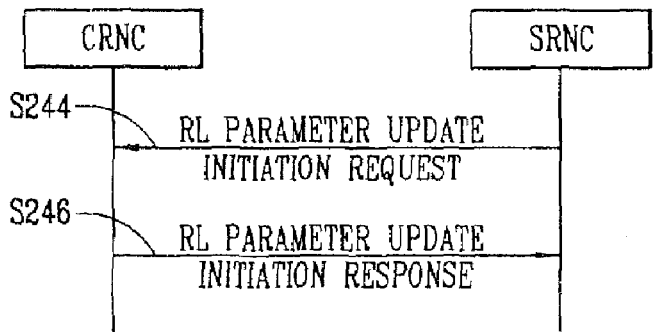
Figure 9A:
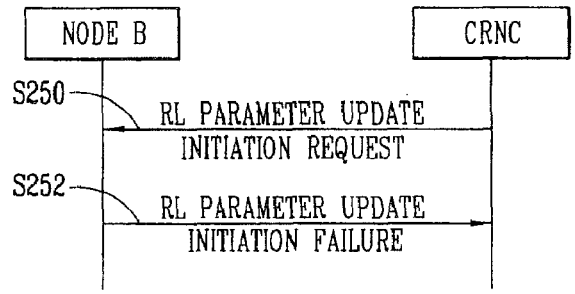
FIGS. 9A and 9B are flow charts of an RL parameter update initiation procedure, in case that the RL parameter update procedure is failed.
Figure 9B:
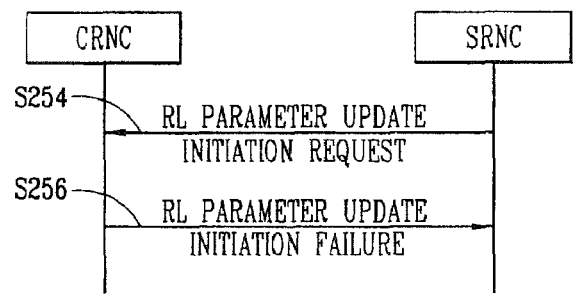

Therefore, in order to use the methods (2-1, 2-2), the parameter updating method (periodical updating/event-based updating) and a signaling for informing a required parameter (period/threshold value) from the SRNC to the node B are required, for which, the present invention defines the RL parameter update initiation procedure, the basic procedure. FIGS. 8A and 8B show the case that the RL parameter update initiation procedure has been successfully performed, and FIGS. 9A and 9B show the case that the RL parameter update initiation procedure is failed).

2. RL Parameter Update Initiation Procedure

As shown in FIG. 8A, when the RL parameter update initiation procedure is initiated, the CRNC sends a RL parameter update initiation request message to the node B (step S240), and the node B sends an RL parameter update initiation response message to the CRNC in response (step S242).

The RL parameter update initiation request message includes a parameter indicating which parameter the node B should measure and an event type parameter. The event type parameter is an enumeration type parameter which has two kinds of values of periodic and event. If the event type parameter value is periodic, parameter updating is performed periodically according to a provided period. Meanwhile, if the event type parameter value is the event, parameter updating is performed when the parameter indicating the state of the radio link exceeds a pre-set upper limit threshold value or lower limit threshold value. In addition, if the event type parameter value is periodic, it additionally includes a parameter informing a period, while if the event type parameter value is the event, it additionally includes a parameter informing a threshold value.

If the CRNC and the SRNC are not collocated, as shown in FIG. 5B, the SRNC sends the RL parameter update initiation request message to the node B through the CRNC (step S244), and receives the RL parameter update initiation response message in response (step S246).

FIGS. 9A and 9B are flow charts showing the case that the RL parameter update initiation procedure is failed.

In response to the RL parameter update initiation request message, the CRNC or the SRNC receives an RL parameter update initiation failure message from the node B or from the CRNC (steps S250, S252, S254 and S256).

As stated above, the node B can send the information which triggers updating the HSDPA related parameter to the RNC according to a period or a threshold value set in the node B itself or a period or a threshold value set by the RNC.

The current 3GPP standard does not allow the node B to detect whether or not the UE is in a handover situation. Therefore, it is difficult that the node B performs the parameter updating in consideration of the condition of the whole radio link for a UE.

In the method 2-3), the RNC informs the node B of the radio link configuration of the UE so that the node B can more properly perform the RL parameter update procedure. The RNC informs the node B of the radio link configuration information whenever the radio link configuration of the UE changes. On the basis of the information, the node B controls the HSDPA related parameter value to be updated.

In order to use the method 2-3), a signaling that the SRNC informs the node B of whether the UE has been in soft handover is required. For this purpose, in the present invention, the RL configuration information procedure, the basic procedure, is defined as shown in FIGS. 10A and 10B.

3. RL Configuration Information Procedure

Figure 10A:
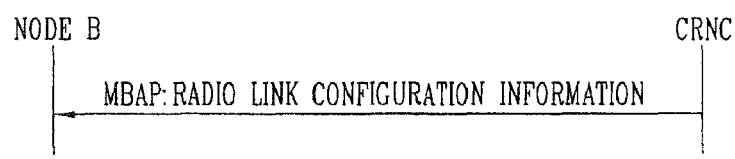
FIGS. 10A and 10B are flow charts showing the case where the radio link configuration information procedure is actually applied.
Figure 10B:
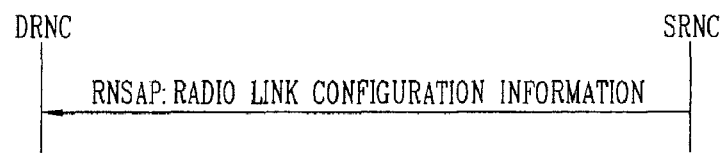

With reference to FIG. 10A, in the RL configuration information procedure, the CRNC sends an RL configuration information message of the NABP protocol to the node B. If the CRNC and the SRNC are not collocated, the SRNC sends the RL configuration information message to the node B through the DRNC as shown in FIG. 10B.

The RL configuration information message may contain configuration information of radio links set in a specific UE (i.e., a list of radio links set in the corresponding UE). With this information, the HSDPA scheduler of the node B can recognize whether the corresponding UE is in a soft handover (SHO) and the number of radio links set in the corresponding UE as well.

The RL configuration information message, a radio link situation report message, is sent to the node B by the RNC when the configuration of the radio link changes such as when a radio link is added to the corresponding UE or when an existing radio link is removed.

The combination of the RL parameter update procedure, the basic procedure, and the method (2-3) occurs in the following cases:

1. the RL parameter update procedure is performed when the corresponding UE enters or leaves a soft handover
2. the RL parameter update procedure is performed when there is a change in the number of radio links of the corresponding UE.

The methods for determining a parameter updating (1, 2, 2-1, 2-2, 2-3) and application example of updating the HSDPA related parameter by using the RL parameter update procedure will now be described.

Figure 11:
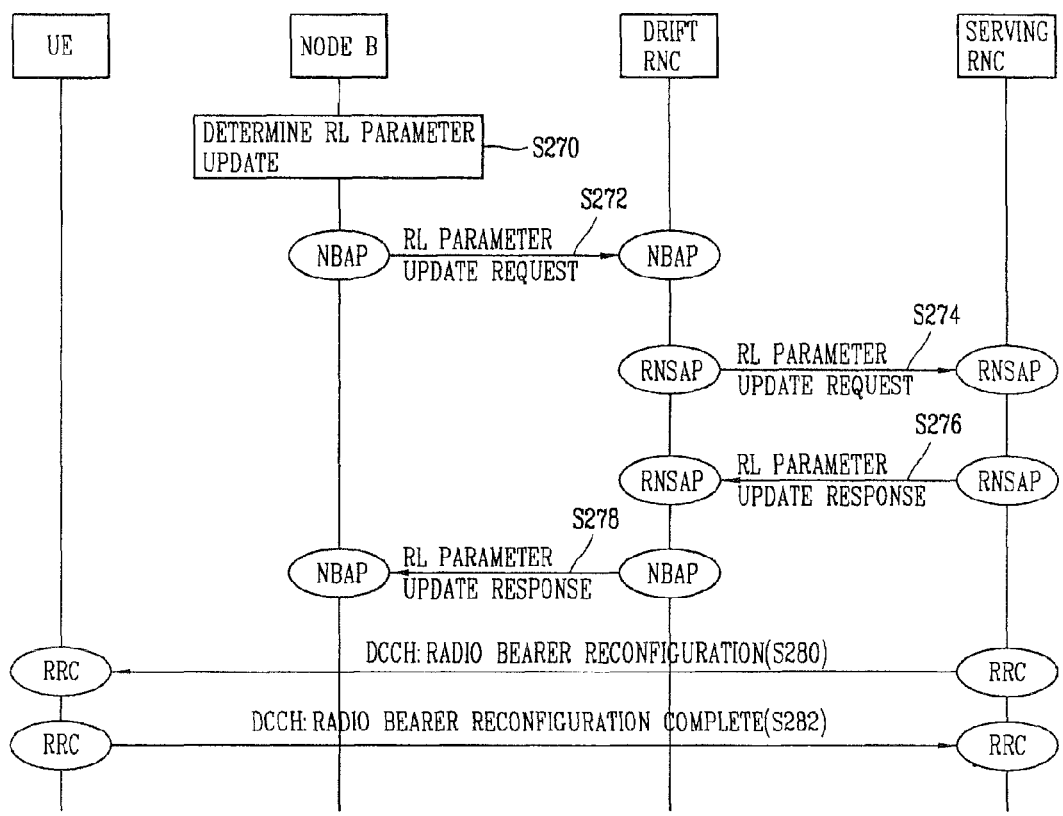
FIG. 11 is a flow chart showing the case where the radio link parameter update procedure is actually applied.

FIG. 11 is a signal flow chart of the RL parameter update procedure. That is, FIG. 11 shows an application example of updating the HSDPA related parameter by using the RL parameter update procedure and the method for determining parameter updating.

Figure 13:
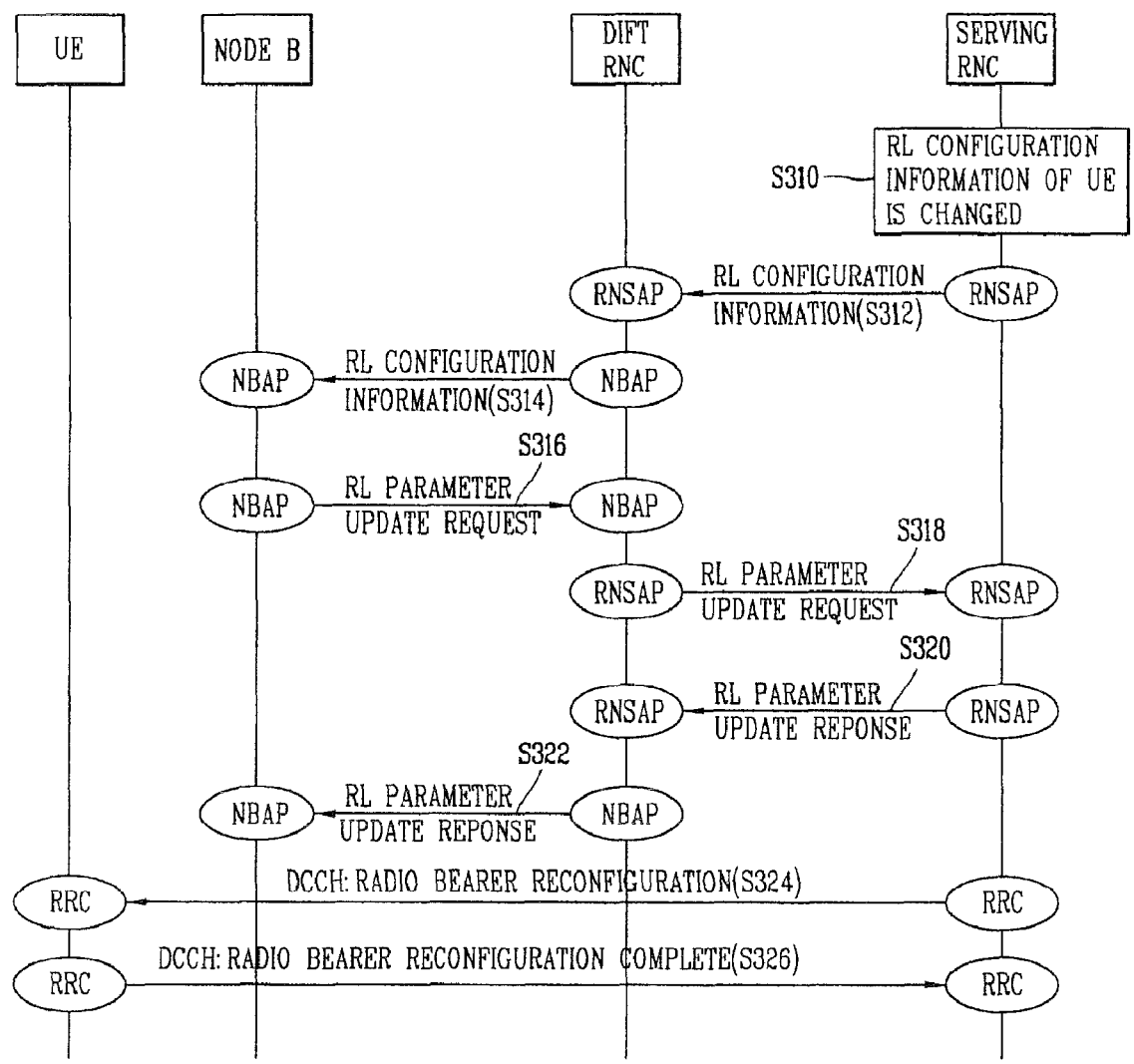
FIG. 13 is a signal flow chart showing the case that the RL configuration information procedure and the RL parameter update procedure are carried out together.

The node B internally measures radio environment or monitors status of user data transmission (e.g. existence or non-existence of a data unit to be transmitted). As shown in FIG. 13, if it's the end of an update period or the parameter indicating the state of the radio link exceeds a certain threshold value, the node B initiates updating of the HS-DPCCH related parameter (step S270). The node B sends the to-be-updated HSDPA related parameter value to the RNC through the RL parameter update request message of the NBAP, to initiate the RL parameter update procedure (step S272).

If there is the DRNC due to mobility of a UE, the DRNC sends the to-be-updated HSDPA related parameter value received from the node B, to the SRNC through the RL parameter update request message of the RNSAP (step S274).

Then, the SRNC sends the updated HSDPA related parameter and activation time, that is, time information as to when the HSDPA related parameter value is to be applied, to the node B through the RL parameter update response message (step S276). The activation time contains a connection frame number (CFN) value indicating when the new HSDPA related parameter is applied.

If the DRNC exists, the DRNC sends the activation time received from the SRNC to the node B through the RL parameter update response message of the NBAP (step S278).

The RNC sends the updated HSDPA related parameter to the UE through the RRC signaling, that is, by using a RRC message such as the radio bearer reconfiguration, transport channel reconfiguration and physical channel reconfiguration message. At this time, the activation time, that is, time information as to when the updated parameter value is to be applied, is also sent over the RRC message. The activation time sent to the UE is the same as the activation time sent to the node B. The RRC message is sent through the logical channel (DCCH).

The UE receives the new HSDPA related parameter from the RNC through the radio bearer reconfiguration, the transport channel reconfiguration, or the physical channel reconfiguration message, updates a stored HSDPA related parameter with the new HSDPA related parameter, and responds thereto with a complete message (step S282). The new HSDPA related parameter value is applied to the corresponding UE at the time point the activation time indicates.

Figure 12:
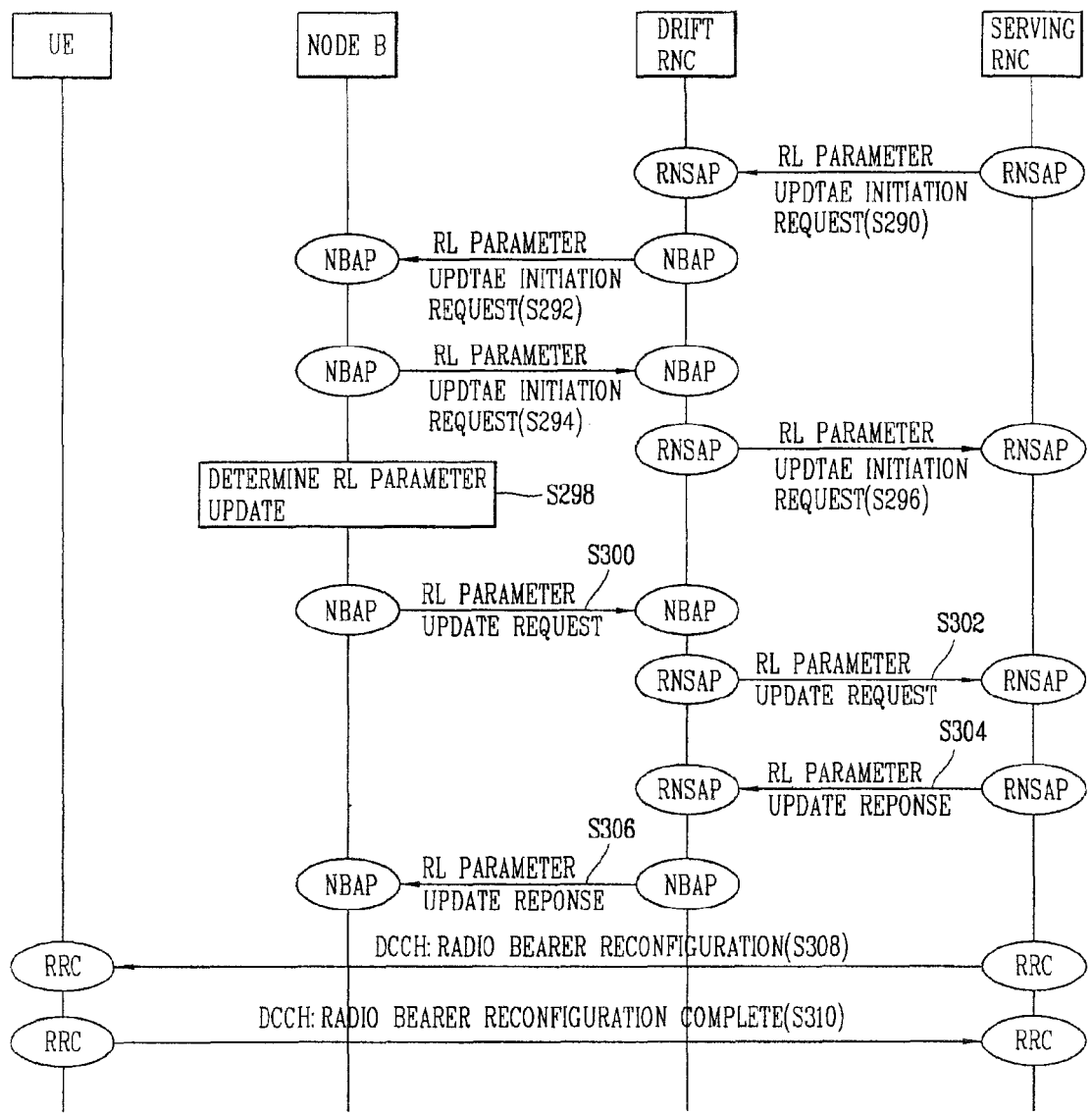
FIG. 12 is a signal flow chart showing the case that the RL parameter update initiation procedure and the RL parameter update procedure are carried out together.

FIG. 12 is a signal flow chart showing an example that the RL parameter update initiation procedure and the RL parameter update procedure are performed together. That is, FIG. 12 shows an example that the HSDPA related parameter is updated by combination of the RL parameter update procedure, the basic procedure, and the method for determining parameter updating (2-1 or 2-2).

The RNC sends the RL parameter update initiation request message to the node B to inform as to whether parameter updating is to be periodically performed or to be performed on the basis of an event (step S290). If the DRNC exists, the SRNC sends the RL parameter update initiation request message to the node B through the DRNC (step S292). In response, the node B sends the RL parameter update initiation response message to the RNC. If the DRNC exists, the node B sends the RL parameter update initiation response message to the SRNC through the DRNC (steps S294 and S296).

Then, the node B determines whether to update the HS-DPCCH related parameter on the basis of the parameter updating method contained in the RL parameter update initiation request message (periodical updating/event-based updating) and its associated parameter (period/threshold value) (step S298).

In other words, if the value contained in the RL parameter update initiation request message satisfies a certain condition (that is, if it's the end of a period or if the parameter indicating the state of the radio link exceeds an upper limit or a lower limit of a threshold value), the node B decides to update (reconfigures) the HSDPA related parameter. And then, the node B sends the to-be-updated HSDPA related parameter to the RNC through the RL parameter update request message of the NBAP. The following operations are the same as those in FIG. 11 except that the step numbers are different, of which descriptions are thus omitted.

FIG. 13 is a signal flow chart showing an example that the RL configuration information procedure and the RL parameter update procedure are performed together. That is, FIG. 13 shows an example that the HSDPA related parameter is updated by the combination of the RL parameter update procedure, the basic procedure, and the method for determining parameter updating (2-3).

If there is a configuration change in the radio link (RL) connected to the corresponding UE, the RNC sends the configuration information message containing the information of the new radio link to the node B, in order to initiate the RL configuration information procedure (step S310).

If the DRNC exists, the SRNC first sends the RL configuration information message to the DRNC (step S312). Then, the DRNC sends the received radio link configuration information to the corresponding node B through the RL configuration information message of the NBAP (step S314).

Upon recognizing the change of radio link configuration from the SRNC, the node B performs the RL parameter update procedure and requests the RNC to reconfigure the existing HSDPA related parameter with the new HSDPA related parameter value for the new radio link configuration. If the DRNC exists, the node B first sends the new HSDPA related parameter value to the DRNC through the RL parameter update request message (step S316). The following procedure is the same as that of FIG. 11, only except that the step numbers are different.

Figure 14:
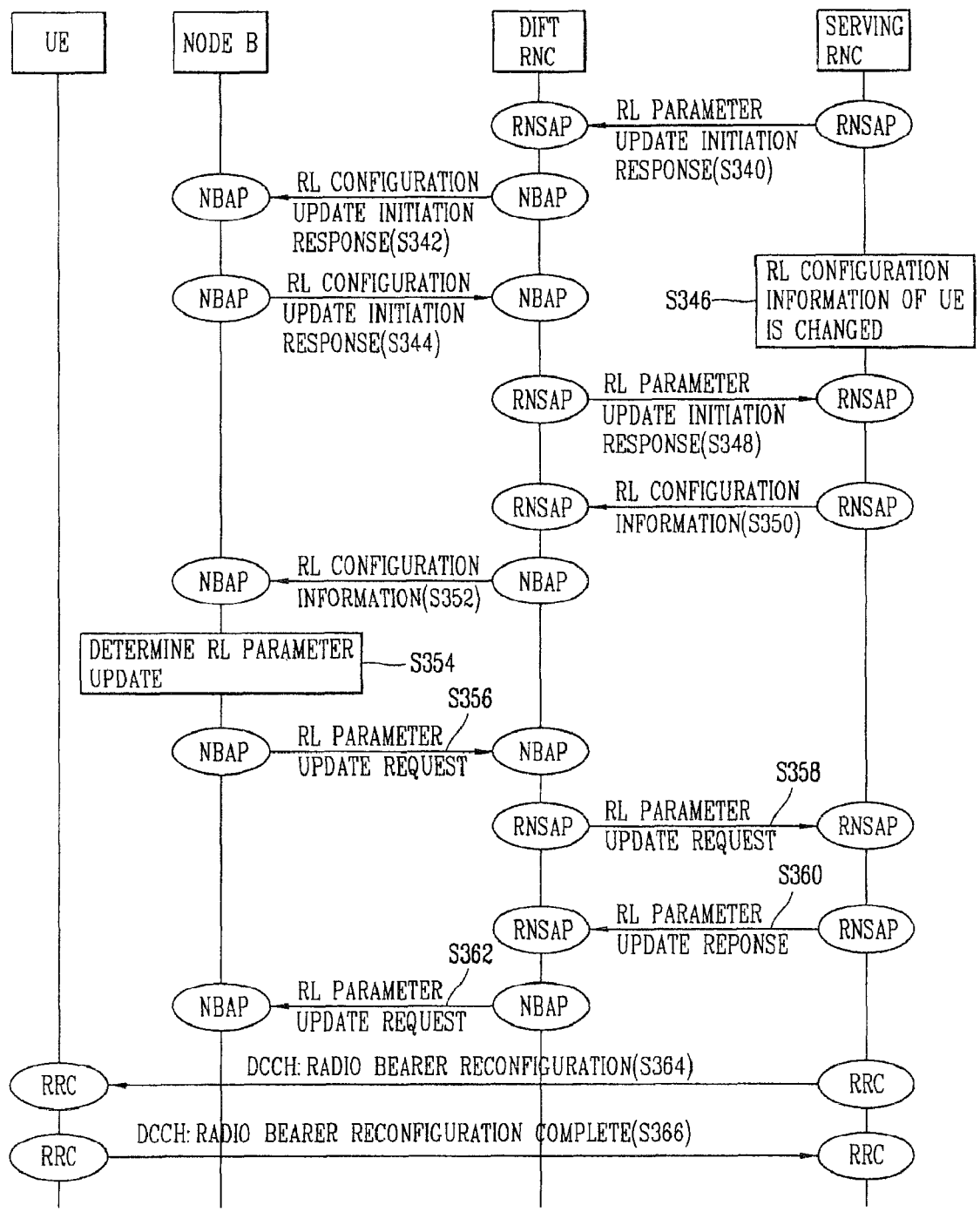
FIG. 14 is a signal flow chart showing the case that the RL parameter update initiation procedure, the RL configuration information procedure and the RL parameter update procedure are carried out together.

FIG. 14 is a signal flow chart showing an example that the RL parameter update initiation procedure, the RL configuration information procedure and the RL parameter update procedure are performed together. That is, FIG. 14 shows an example that the node B determines whether to update the HS-DPCCH related parameter by using the method (2-1 or 2-2) and it calculates more exact parameter value by adopting the method (2-3).

With reference to FIG. 14, the RNC sends the RL parameter update initiation request message to the node B in order to inform whether a parameter updating report is to be periodically performed or performed on the basis of an event. If the DRNC exists, the SRNC first sends the RL parameter update initiation request message to the DRNC (step S340), and then the DRNC sends the RL parameter update initiation request message received from the SRNC to the corresponding node B (step S342).

In response, the node B sends a RL parameter update initiation response message to the RNC. If there exists the DRNC, the DRNC sends the RL parameter update initiation response message received from the node B, to the SRNC (steps S344 and S348).

If there is a configuration change in the radio link connected to the corresponding UE, the RNC informs the node B of the new radio link configuration information through the RL configuration information message. If the DRNC exists, the SRNC first sends the RL configuration information message to the DRNC (step S350), and then, the DRNC informs the node B of the radio link configuration information through the RL configuration information message of the NBAP (step S352).

Upon recognizing the configuration change in the radio link from the SRNC, the node B determines updating of the HSDPA related parameter if the corresponding condition is satisfied (that is, if it exceeds the upper limit or the lower limit of the period/threshold value) (step S354). At this time, the node B determines more proper HS-DPCCH related parameter value in consideration of the configuration change information in the radio link received from the SRNC through the RL configuration information message. If the DRNC exists, the node B first sends the new HS-DPCCH related parameter value to the DRNC through the RL parameter update request message (step S356), and the following procedure is the same as that of FIG. 11 only except that the step numbers are different.

As so far described, the radio link parameter updating method in a mobile communication of the present invention has the following advantages.

That is, the base station (the node B) initiates updating of the HS-DPCCH related parameter by itself and sends the to-be-updated parameter value to the RNC, so that the HS-DPCCH related parameter can be finally updated in the RNC.

Thus, compared to the conventional art in which the HS-DPCCH related parameter, that is, the CQI feedback cycle (k) value, can be updated only through the radio link setup and the radio link reconfiguration procedure initiated by the RNC, in the present invention, the HS-DPCCH related parameter is updated through the radio link parameter update procedure initiated by the base station, so that the HS-DPCCH related parameter can be updated at the optimum moment.

With the proposed procedure that the base station signals the to-be-updated parameter to the RNC, the base station applies the optimum parameter value reflecting the situation of the radio link.

In addition, when the base station (node B) initiates the parameter update procedure, the RNC provides a procedure providing information required for determining the parameter updating, so that other parameters than the k value can be also updated suitable to the situation of the base station.

Moreover, by defining the procedure that the RNC informs the base station of the soft handover or a change in the situation of the radio link, the base station can perform the parameter updating in consideration of every situation of the radio link. That is, in the case that the configuration of the radio link changes, for example, when a radio link is newly added to the terminal or when the existing radio link is removed therefrom, the base station is able to set a parameter suitable to the situation.

Consequently, we can effectively prevent a waste of power or resource cased by setting of improper parameters by appropriately applying the proposed procedures depending on the condition of radio links for a terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of updating a radio link parameter for a radio communications system having a network controller and a base station connected with the network controller, the method comprising:
   when the base station needs to update the radio link parameter,
   sending parameter information to initiate update of the radio link parameter through a message between the base station and the network controller,
   wherein the radio link parameter is a high speed downlink packet access (HSDPA) related parameter for high speed downlink shared channel (HS-DSCH), and the base station includes a Medium Access Control-high speed (MAC-hs) sub-layer, which manages a HS-DSCH, wherein the HS-DSCH is a transport channel and is mapped to a high speed physical downlink shared channel (HS-PDSCH),
   wherein the parameter information is related to a High Speed-Dedicated Physical Control Channel (HS-DPCCH), and
   wherein the parameter information includes at least one of a channel quality indicator (CQI) feedback cycle information, and a CQI repetition factor information, and
   wherein the message is sent to the network controller from the base station.

2. The method of claim 1, wherein the parameter information further comprises an ACK/NACK repetition factor information.

3. The method of claim 1, wherein the parameter information further comprises at least one of a CQI power offset information, an ACK power offset information, a NACK power offset information, and HS-SCCH code change indicator information.

4. The method of claim 1, wherein the HS-DPCCH uses a 2 ms sub-frame.

5. The method of claim 1, wherein the 2 ms sub-frame includes 3 slots.

6. The method of claim 1, the parameter information is a parameter value.

7. The method of claim 1, wherein the base station initiates the update of the radio link parameter when a radio channel state of a user terminal is changed.

8. The method of claim 1, wherein the base station initiates the update of the radio link parameter at every regular periods or when the radio link parameter exceeds a certain threshold value.

9. The method of claim 8, wherein the period and the threshold value are set within the base station.

10. The method of claim 8, wherein the period and the threshold value are provided from the network controller.

11. The method of claim 1, wherein the base station controls the parameter information according to radio link configuration information of a user terminal.

12. The method of claim 11, wherein the radio link configuration information is sent from the network controller.

13. The method of claim 11, wherein the base station analyzes the radio link configuration information and initiates the update of the radio link parameter only when the user terminal initiates and terminates a handover.

14. The method of claim 11, wherein the base station needs to update the radio link parameter only when the number of radio links of the user terminal changes.

15. The method of claim 1, wherein the base station has a hybrid automatic repeat request (HARQ) function.

16. The method of claim 1 further comprising:
   transmitting the parameter information updated at the network controller and time information to a user terminal.

17. The method of claim 16, wherein the time information is an activation time.

18. The method of claim 17, wherein the activation time including a connection frame number (CFN) value.

19. The method of claim 1, wherein the network controller is a controlling radio network controller (CRNC).

20. A method of processing radio link parameter information for a radio communications system having at least one network controller, at least one base station connected with the network controller, and at least one user terminal in communication with the base station, the user terminal performing the method comprising:
   receiving high-speed downlink packet access related radio link parameter information from the network controller; and
   performing parameter configuration by using the received high-speed downlink packet access (HSDPA) related radio link parameter information for High Speed-Downlink Shared Channel (HS-DSCH), which was previously delivered from the base station to the network controller through a message between the base station and the network controller, and the base station includes a Medium Access Control-high speed (MAC-hs) sub-layer, which manages a HS-DSCH, wherein the HS-DSCH is a transport channel and is mapped to a High Speed-Physical Downlink Shared Channel (HS-PDSCH),
   wherein the parameter information is related to a High Speed-Dedicated Physical Control Channel (HS-DPCCH), and
   wherein the parameter information includes at least one of a channel quality indicator (CQI) feedback cycle information, and a CQI repetition factor information.

21. The method of claim 20, wherein the parameter information further comprises an ACK/NACK repetition factor information.

22. The method of claim 20, wherein the parameter information further comprises at least one of a CQI power offset information, an ACK power offset information, a NACK power offset information, and HS-SCCH code change indicator information.

23. The method of claim 20, wherein the HS-DPCCH uses a 2 ms sub-frame.

24. The method of claim 23, wherein the 2 ms sub-frame includes 3 slots.

25. The method of claim 20, wherein the high-speed downlink packet access related radio link parameter information is received via a Radio Resource Control signaling.

26. The method of claim 25, wherein the Radio Resource Control signaling uses at least one of a radio bearer reconfiguration, a transport channel reconfiguration, and a physical channel reconfiguration message.

27. The method of claim 20, wherein the receiving step is performed after a radio link parameter update procedure was initiated by the base station.

28. The method of claim 27, further comprising:
sending the message from the base station to the network controller to configure at least one high-speed downlink packet access related radio link parameter of the base station according to the initiated radio link parameter update procedure.

29. A method of updating a radio link parameter for a radio communications system having a network controller and a base station connected with the network controller, the network controller performing the method comprising:
receiving parameter information to update of the radio link parameter through a message between the base station and the network controller when the base station needs to update the radio link parameter,
wherein the radio link parameter is a high speed downlink packet access (HSDPA) related parameter for High Speed-Downlink Shared Channel (HS-DSCH), and the base station includes a Medium Access Control-high speed (MAC-hs) sub-layer, which manages a HS-DSCH, wherein the HS-DSCH is a transport channel and is mapped to a High Speed-Physical Downlink Shared Channel (HS-PDSCH),
wherein the parameter information is related to a High Speed-Dedicated Physical Control Channel (HS-DPCCH),
wherein the parameter information includes at least one of a channel quality indicator (CQI) feedback cycle information, and a CQI repetition factor information, and
wherein the message is received by the network controller from the base station.

30. The method of claim 29, wherein the parameter information further comprises an ACK/NACK repetition factor information.

31. The method of claim 29, wherein the parameter information further comprises at least one of a CQI power offset information, an ACK power offset information, a NACK power offset information, and HS-SCCH code change indicator information.

32. The method of claim 29, wherein the HS-DPCCH uses a 2 ms sub-frame.

33. The method of claim 32, wherein the 2 ms sub-frame includes 3 slots.

34. The method of claim 29, the parameter information is a parameter value.

35. The method of claim 29, wherein the base station needs to update the radio link parameter when a radio channel state of a user terminal is changed.

36. The method of claim 29, wherein the base station needs to update the radio link parameter at every regular periods or when the radio link parameter exceeds a certain threshold value.

37. The method of claim 36, wherein the period and the threshold value are set within the base station.

38. The method of claim 36, wherein the period and the threshold value are provided from the network controller.

39. The method of claim 29, wherein the base station has a hybrid automatic repeat request (HARQ) function.

40. The method of claim 29, wherein the network controller is a controlling radio network controller (CRNC).

* * * * *